United States Patent [19]

Marrick et al.

[11] Patent Number: 5,148,468
[45] Date of Patent: Sep. 15, 1992

[54] DOOR ANSWERING SYSTEM

[76] Inventors: Paul J. T. Marrick; Gregory J. Arnold, both of 749 S. Lemay #249, Fort Collins, Colo. 80524; Rudolph A. Sauter, 4746 Evening Cove Rd., Ladysmith, B.C. V0R2E0, Canada

[21] Appl. No.: 602,471

[22] Filed: Oct. 24, 1990

[51] Int. Cl.⁵ .................... H04M 9/02; H04M 11/00
[52] U.S. Cl. ........................................ 379/56; 379/67; 379/167; 379/176
[58] Field of Search ..................... 329/56, 61, 167, 67, 329/176

[56] References Cited

U.S. PATENT DOCUMENTS 4,631,365 12/1986 Potter et al. .................... 379/56
4,809,320 2/1989 Hawkins et al. ................ 379/167

FOREIGN PATENT DOCUMENTS 0016059 1/1989 Japan ............................ 379/167

Primary Examiner—Stafford D. Schreyer
Attorney, Agent or Firm—Dean P. Edmundson

[57] ABSTRACT

A door answering system is described for enabling the occupant of a structure (e.g., house, apartment, etc.) to provide a pre-recorded message to a visitor who has approached the entrance of the structure. The system includes a speaker/microphone and a call switch at the entrance for the visitor. Inside the structure there is a recorder/player for playing a pre-recorded message and recording a message left by the visitor.

6 Claims, 3 Drawing Sheets

DOOR ANSWERING SYSTEM

FIELD OF THE INVENTION

This invention relates to security systems. More particularly, this invention relates to security systems for home or business use. Even more particularly, this invention relates to security systems for answering a door and receiving messages.

BACKGROUND OF THE INVENTION

Security is becoming more important, particularly for the elderly and for persons who live alone. For example, many people are reluctant to answer their door because they are not sure that they want to reveal their presence without knowing who is at the door.

Although a conventional peep hole enables a person on the inside of the door to view through the door, this does not always allow a view of who is on the outside of the door. For example, the person on the outside may cover the peep hole, or lack of light may interfere with viewing the person outside the door.

Another situation which sometimes arises is that a burglar will knock on the door or ring the doorbell. If there is no answer then the burglar feels more confident that it is safe to break into the apartment or house. If, however, someone answers the door, then the burglar simply leaves and goes to another residence to try again.

In yet another situation which often arises, the resident or occupant cannot or does not want to answer the door for some reason but still wants to receive a message from the person at the door. Although an intercom system may be used from a remote location of the residence, this requires the resident to acknowledge that he or she is actually present. The resident may not want to do this.

There has not heretofore been provided a security system for answering the door of a residence, or even certain businesses, where the resident or occupant does not want to announce his or her presence.

SUMMARY OF THE PRESENT INVENTION

In accordance with the present invention there is provided a door answering system which enables the occupant of a structure (e.g., house, apartment, condo, office, etc.) to provide a pre-recorded message to a visitor who has approached the door or entrance of the structure. In one embodiment the invention provides a door answering system comprising:

(a) first speaker means accessible at the entrance to the structure;

(b) first switch means accessible at said entrance;

(c) recorder means located interiorly of the structure; wherein the recorder means includes a pre-recorded message. Actuation of the first switch by means the visitor activates the recorder means for receiving the pre-recorded message through the first speaker means.

In other embodiments the door answering system includes a speaker in the interior of the structure to enable the occupant to listen to a message from the visitor and then answer that message. In another embodiment the system includes means for enabling the recorder to record a message from the visitor.

The door answering system serves as a security system in addition to being a convenience system. By providing a pre-recorded message when a visitor actuates the switch at the entrance, the system informs a visitor that the occupant is unable to answer the door. The system also thereby can create some uncertainty in the mind of the visitor as to whether the occupant is in fact present at that time. This is very desirable because it would normally deter a prospective burglar from attempting to enter the structure.

The answering system is relatively easy to install and may even be installed by a consumer purchaser. It also is inexpensive yet very functional.

The answering system can also be used at commercial businesses (e.g., when the proprietor or his secretary is temporarily away and clients or customers desire to leave a message) This can save time and also helps to maintain good communications and relations between the proprietor and his clients or customers. The system also serves as a security system for the business.

The answering system is also useful in enabling the occupant or resident to determine if a violent or threatening person (e.g., drunk or disorderly or irate person) is present at the door. Also, if a person at the door is violating a restraining order, the resident or occupant can notify authorities without alerting the person at the door.

The answering system is also beneficial in situations where a burglary has occurred in the neighborhood and police officers need to notify neighbors and to inquire as to potential witnesses, etc.

The answering system is also very useful in situations where a delivery is attempted at the residence or business (e.g., by U.P.S.). If the occupant or proprietor is absent, the delivery person can leave an appropriate voice message on the recorder. Also, the occupant or proprietor can leave an appropriate message on the recorder for the delivery person if he or she has anticipated such an attempted delivery (e.g., a message can be given to the delivery person to deliver to a neighbor or to another address).

The answering system of the invention can also be used by police departments at the front door. Small rural police departments are not open all night. The answering system can be used to receive messages or anonymous tips during the night or at any time.

Also, fire departments can use the answering system when all of the firemen are out on call. Ambulance services can similarly use the system. College dormitories can also use the answering system as a security system.

In another embodiment, an occupant or resident who is handicapped can easily monitor visitor's messages and can reply from a remote location in the residence even if he or she cannot travel to the door to open it.

Other advantages of the door answering system of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
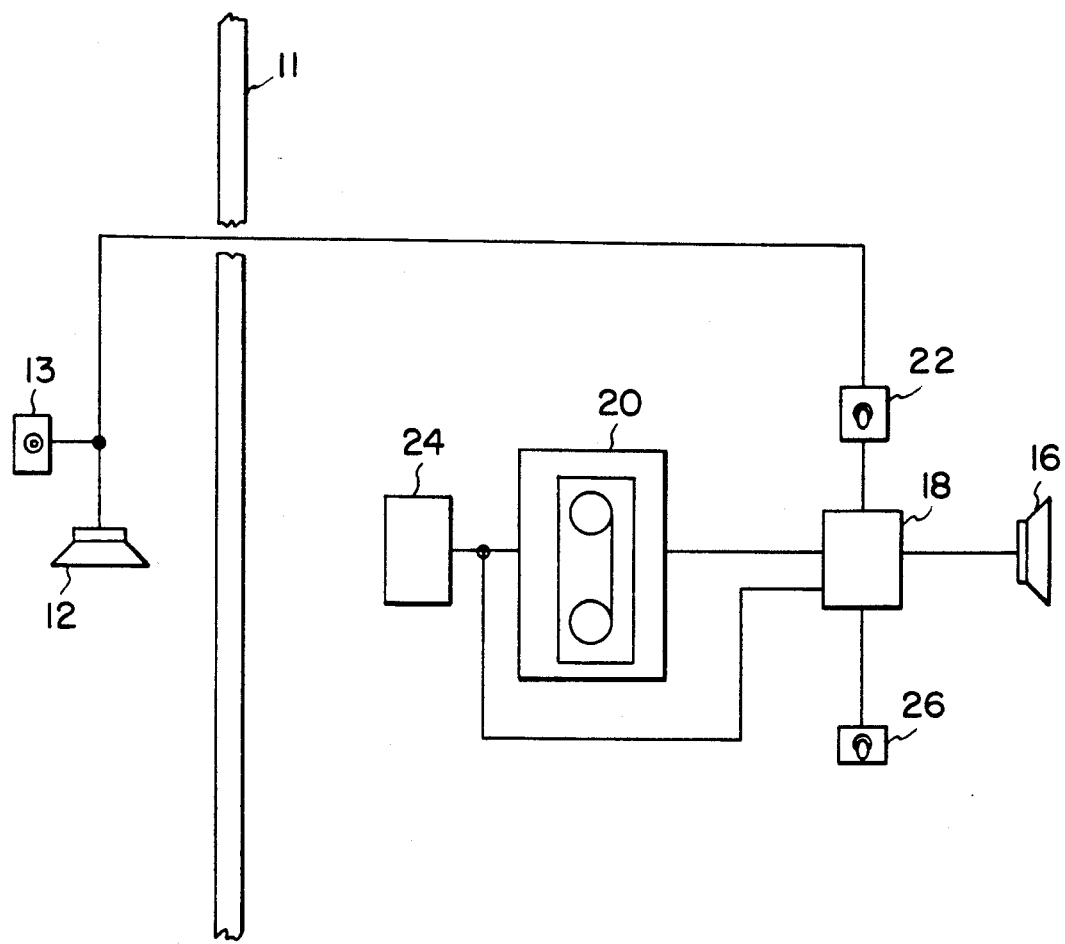
FIG. 1 illustrates one embodiment of a door answering system of the invention.

In FIG. 1 there is illustrated one embodiment of a door answering system which includes a first speaker 12 and call switch 13 accessible at or near the entrance door or gate 11.

Inside of the structure (e.g., house, apartment, condo, etc.) there is a speaker 16 connected to an amplifier 18. Preferably there is also a talk/listen switch 22 operatively connected between the outside speaker and the amplifier. An electrical cable 14 connects the outside speaker to the amplifier, as illustrated.

A tape recorder 20 is operatively connected to the amplifier. A power supply 24 is also included (e.g., 110 VAC). A function switch 26 is operatively connected to the recorder.

When the switch 13 is actuated by a visitor the recorder is activated in a manner that it plays a pre-recorded message to the visitor. For example, the message might be "I'm unable to answer the door at this time but please leave a message after the tone". Of course, any other desired message also could be given. This type of message leaves a visitor uncertain as to whether the occupant is present or not. This is desirable because it can cause a prospective burglar to leave without attempting to enter the structure.

If the visitor is a legitimate visitor, then he or she can simply identify himself or herself and leave a message on the recorder. At that time, if the occupant is in fact present and desires to greet the visitor, he or she may actuate the switch 22 and speak directly to the visitor.

Figure 2:
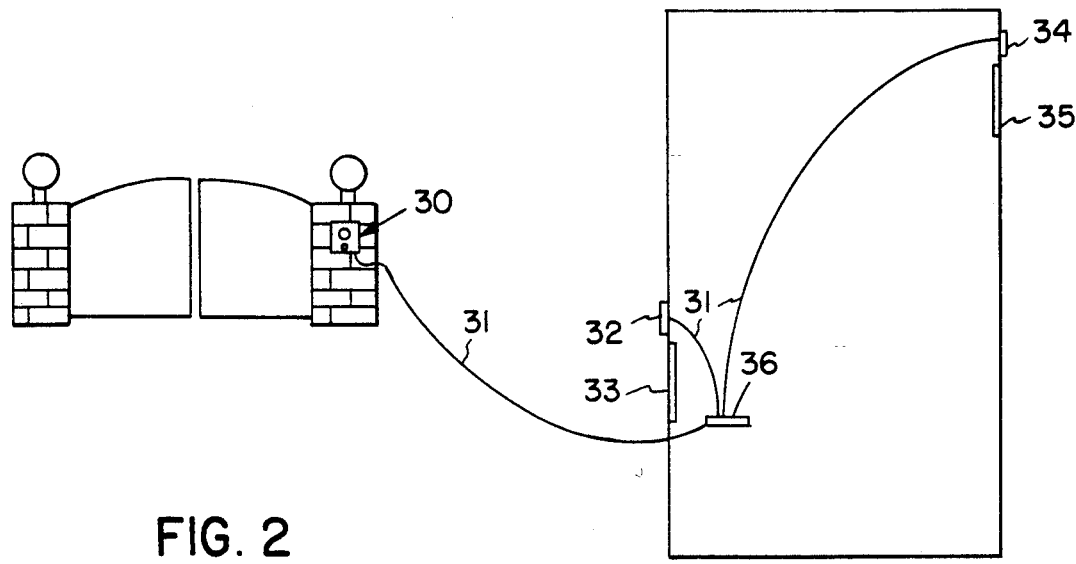
FIG. 2 illustrates another embodiment of a door answering system of the invention.

FIG. 2 illustrates another door answering system of the invention which includes several outside speakers positioned at various locations around a structure (e.g., speaker 30 is located at the front gate, speaker 32 is near the front door 33, and speaker 34 is located near the rear door 35). The interior master unit 36 is operatively connected to each of the outside speaker units by means of cables.

Figure 3:
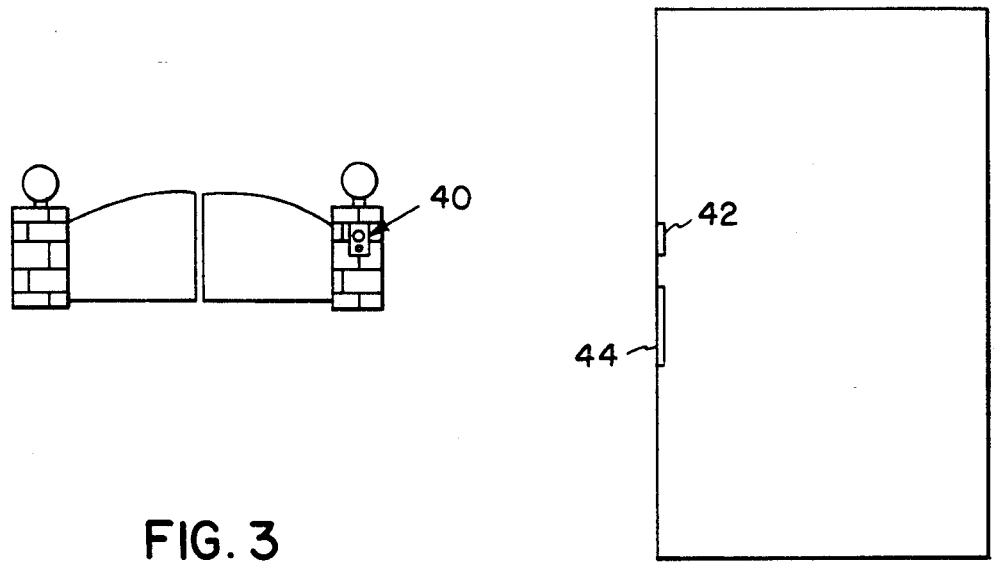
FIG. 3 illustrates yet another embodiment of a door answering system of the invention.

FIG. 3 illustrates another embodiment of door answering system of the invention. In this embodiment the outside speaker 40 is positioned at the front gate or entrance and the interior master unit 42 is located inside the structure near the front door 44. The outside speaker unit is operatively associated with the inside master unit by means of low power VHF radio signals.

Where the outdoor unit is a considerable distance from the residence, a lower power VHF transmission link is very useful. This avoids the need for installing cables between the inside and outside units. Sometimes it is very expensive or undesirable to install underground cables where there is expensive landscaping or driveways, etc.

Figure 4A:
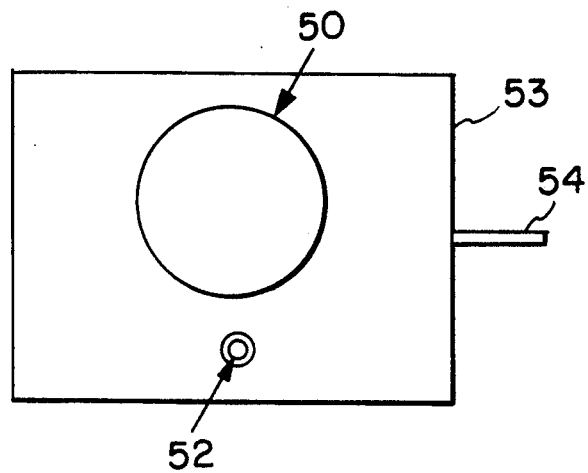
FIGS. 4A and, 4B illustrate embodiments of inside and outside units of a door answering system of the invention.

FIG. 4A shows one type of speaker and switch system which is useful near the entrance to a structure. The speaker 50 and call button or switch 52 are contained in a housing or enclosure 53. Cable 54 connects the exterior system to the interior control unit. The speaker is the type which is also capable of functioning as a microphone to pick up the visitor's voice message and transmit it via cable 54 to the interior control unit.

Figure 4B:
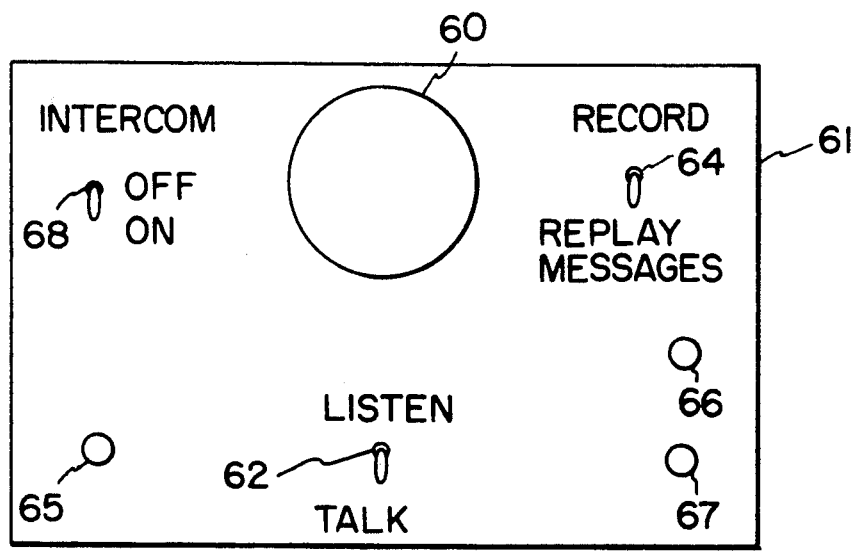

FIG. 4B shows one type of interior control unit comprising speaker 60, listen/talk switch 62, message replay switch 64, message light 65, volume control button 66, power on indicator 67, and switch 68 for turning the unit on and off and activating an intercom function. Inside the enclosure 61 there is contained a tape recorder/player for playing a pre-recorded message in response to a visitor actuating the call button or switch near the entrance to the structure. Then the recorder is able to record a voice message from the visitor.

As another variation, there may be one or more broadcast speakers secured to the outside of the residence. In the event that the occupant or resident desires to alert neighbors to a particular problem, or to call for assistance, the occupant can activate the broadcast speaker(s) and broadcast an emergency call for assistance.

The door answering system of the invention may be powered by 110 VAC or low voltage D.C. If desired, it could also be battery powered. It may also include a battery back-up in case of power failure. The system may be simply attached to a resident's front door (with the outside speaker and switch secured to the exterior of the door and the interior speaker switch, and recorder secured on the interior surface of the door). Attachment to the door can be convenient, and use of the system is very effective and easy to understand.

Other variants are also possible without departing from the scope of the invention.

What is claimed is:

1. A door answering system which enables the occupant of a structure to provide a pre-recorded message to a visitor who has approached the entrance of said structure; wherein said system comprises:
   (a) first speaker means accessible at said entrance;
   (b) first switch means accessible at said entrance;
   (c) recorder means located interiorly of said structure; said recorder means including said pre-recorded message;
wherein actuation of said first switch means by said visitor activates said recorder means for transmitting said pre-recorded message through said first speaker means, wherein said first speaker means is operatively connected to said recorder means by means of a radio transmitter.

2. A system in accordance with claim 1, wherein said recorder means is adapted to record a voice message from said visitor.

3. A door answering system in accordance with claim 2, wherein said first speaker means includes a microphone for receiving voice messages from said visitor.

4. A door answering system in accordance with claim 3, wherein said system further includes (a) second speaker means located within said structure for broadcasting voice messages from said visitor, and (b) second switch means located within said structure which enables said occupant to activate said second speaker means to transmit a voice message to said visitor.

5. A door answering system in accordance with claim 4, wherein said structure includes a second entrance, wherein said system further comprises third speaker means accessible at said second entrance.

6. A door answering system which enables the occupant of a structure to provide a pre-recorded message to a visitor who has approached the entrance of said structure, wherein said system comprises:
   (a) first speaker means accessible at said entrance; wherein said speaker means includes a first microphone;
   (b) first switch means accessible at said entrance;

(c) recorder means located interiorly of said structure; said recorder means including said pre-recorded message;
(d) second speaker means located interiorly of said structure; wherein said second speaker means includes a second microphone;
(e) second switch means located interiorly of said structure; wherein said second switch means is movable between a first position to activate said second microphone and a second position to activate said second speaker means;

wherein actuation of said first switch means by said visitor activates said recorder means for transmitting said pre-recorded message through said first speaker means; wherein said first speaker means is operatively connected to said recorder means by means of a radio transmitter.

* * * * *